United States Patent [19]

Pavy et al.

[11] Patent Number: 4,636,162
[45] Date of Patent: Jan. 13, 1987

[54] APPARATUS FOR MAKING A TUBULAR SHEATH OF PLASTIC MATERIAL

[75] Inventors: Michel Pavy, Wattignies; Alain Genty, Mouvaux, both of France

[73] Assignee: Nortene, Lille, France

[21] Appl. No.: 797,497

[22] Filed: Nov. 13, 1985

[30] Foreign Application Priority Data

Nov. 13, 1984 [FR] France ................................ 84 17280

[51] Int. Cl.$^4$ ...................... B29C 47/00; B29C 55/26; B29C 61/08
[52] U.S. Cl. ........................... 425/290; 264/DIG. 73; 264/DIG. 81; 425/307; 425/308; 425/377; 425/392
[58] Field of Search ............... 425/289, 296, 290, 297, 425/302.1, 308, 376 R, 377, 392, 393, 397; 264/DIG. 73, DIG. 81

[56] References Cited

U.S. PATENT DOCUMENTS

| 3,137,746 | 6/1964 | Seymour et al. | 264/DIG. 73 |
| 3,841,815 | 10/1974 | Labarre | 425/290 |
| 4,455,337 | 6/1984 | Lloyd et al. | 264/DIG. 81 |
| 4,470,942 | 9/1984 | Beretta | 264/DIG. 81 |
| 4,536,429 | 8/1985 | Mercer | 264/DIG. 81 |

Primary Examiner—Willard E. Hoag
Attorney, Agent, or Firm—Brisebois & Kruger

[57] ABSTRACT

Apparatus for making a tubular plastic sheath having one or more imperforate panels around the periphery of the sheath with intervening plastic net connecting the imperforate panels, the apparatus including an extruder, perforating means and stretching means, the improvement being extrusion means to form bands of different thickness asbout the sheath the perforation means being positioned such as to perforate only bands of one thickness.

6 Claims, 3 Drawing Figures

APPARATUS FOR MAKING A TUBULAR SHEATH OF PLASTIC MATERIAL

This invention relates to apparatus for making, from plastic material a tubular sheath or sleeve of the type having solid or continuous longitudinal bands of film connected together by longitudinal bands of mesh or net.

BACKGROUND OF THE INVENTION

Tubular sheaths or sleeves having solid or continuous longitudinal bands of film connected together by longitudinal bands of mesh or net and which can be used to make bags or sacks for packaging, are described in French application no. 84-11518 of applicant's assignee.

Such tubular sheaths have alternate narrow bands of film and wide bands of a mesh or net structure, and are made by using an apparatus like the apparatus described in French patent No. 7143207 and its certificate of addition, No. 7240691.

In particular, apparatus to make such tubular sheaths or sleeves has an extrusion nozzle with an annular gap between two concentric extrusion die members, and which opens into an extrusion annulus. There are several toothed wheels which orbit around the axis of the draw plate and are simultaneously driven about their own axes. These toothed wheels are so positioned that the teeth of the wheels perforate the wall of the tubular sheath leaving the extrusion annulus. The wheels are placed in the immediate vicinity of the extrusion annulus and each wheel is positively driven in controlled rotation around its own axis by pinion gearing in mesh with a toothed ring gear. The perforations made in the tubular sheath, by the teeth of the wheels, as the sheath is extruded, are enlarged by stretching the sheath over a shaper or expander located under the extrusion annulus and over which the perforated sheath is moved.

The wheels make diagonal or inclined rows of perforations with respect to the longitudinal axis of the extrusion nozzle, the perforations being enlarged as the sheath is stretched over the expander to make a net or mesh structure with meshes, for example, in the shape of diamonds, the long diagnols of which are essentially parallel with the axis of the extrusion die. To form in the tubular sheath the alternate strips or bands of net structure and solid film structure, several teeth are usually omitted from each of the wheels so that the wheels only perforate certain longitudinal zones of the sheath as it is extruded. The perforated regions which form the net bands are stretched more than the solid film bands as the sheath is stretched over the expander. This technique is satisfactory when it is desired to make tubular sheaths with solid film bands which are relatively narrow with respect to the bands of net or mesh structure.

In certain applications, as for example when the sheath is used for packaging, or to make sacks, it is desirable to have relatively wide film bands, particularily for product descriptions or advertising.

SUMMARY OF THE INVENTION

The present invention has for an object, a tubular sheath of plastic material comprised of alternate strips or bands of solid film structure and net structure in which all the bands of solid film have the same width, and in which the width of each of the bands of net structure is less than about 2.5 times the width of each of the bands of solid film structure.

To form such a tubular sheath the apparatus of the invention, is of the general type described above, and is characterized by the fact that it has on one of the dies defining the annular clearance space, several longitudinal regions of increased radial thickness, which can take the form of projections extending into the clearance space along a portion of the height and width of the clearance space.

These projection or zones of increased thickness, in accordance with the invention, can be made on the inner die or the outer die, the radial thickness being between about 10% and 60% of the width of the clearance space, and preferable about 20% of the clearance space.

In accordance with the invention, as many zones of increased thickness or projections are provided as there are to be bands of solid film in the the tubular sheath, for example, four projections of the same width evenly spaced around the perimeter of the the clearance space.

It is to be understood that the projections or regions of increased radial thickness form in the tubular sheath leaving the extrusion annulus, longitudinal bands of reduced thickness, which can be more easily stretched radially, after leaving the extrusion annulus, thus allowing the manufacture of the tubular sheath according to the invention which has bands of solid film appreciably wider than those previously obtained. In addition, the size of the meshes of the net bands can be controlled independantly of the control of the width of the bands of solid film.

Other advantages and characteristics of the invention will become apparrant from the following description of a preferred embodiment, presented as a non-limiting example, with reference to the accompanying drawings.

DETAILED DESCRIPTION

Figure 1:
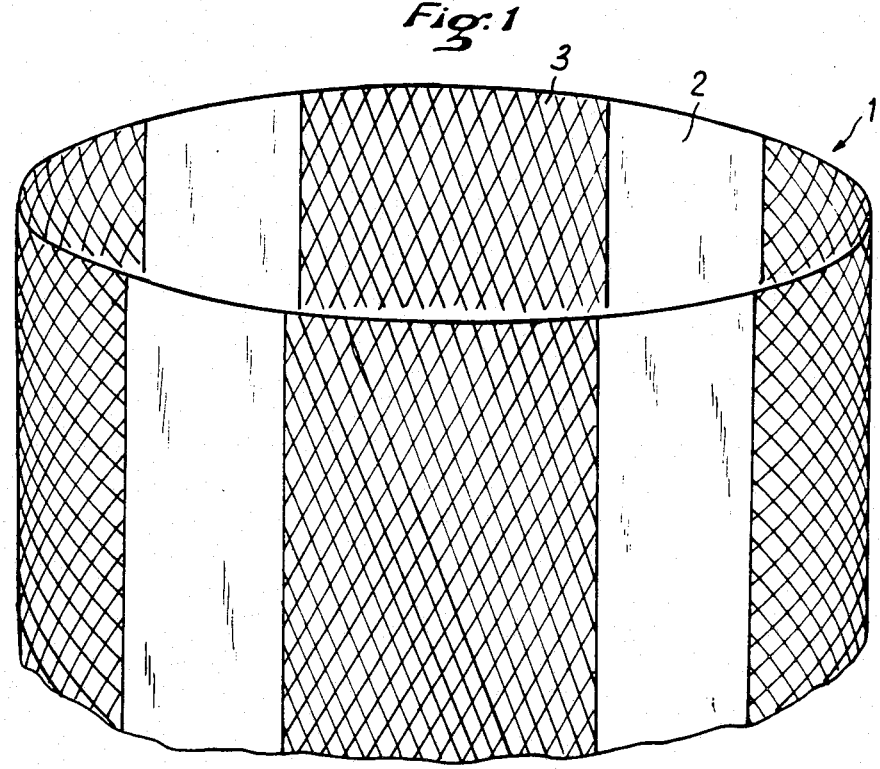
FIG. 1 shows a a tubular sheath or sleeve manufactured in accordance with the invention.

FIG. 1 shows a relatively short length of a tubular sleeve or sheath 1 manufactured in accordance with the invention. The sheath 1 has four longitudinal strips or bands 2 of continuous or solid film structure and which are integrally connected together by four strips or bands 3 of net or mesh structure. In the sheath shown as an example in FIG. 1, the net or mesh structure includes diagonally extending mesh threads to form a mesh or net of a diamond pattern.

The tubular sheath or sleeve manufactured in accordance with the invention can be made of any appropriate plastic material, particularily polyethylene.

By way of example, a sheath or sleeve 1 has been made of polyethylene in which each film strip or band 2 has a width of 5 cm and each of the mesh bands 3 has a width of about 7.5 cm.

These dimensions are given to compare with the strip or band widths of the sheaths which are now being manufactured and which, for the same diameter, have a width of the strips of solid film structure not greater than 3 cm.

The apparatus for forming the sheath of FIG. 1 will now be described with reference to FIGS. 2 and 3.

Figure 3:
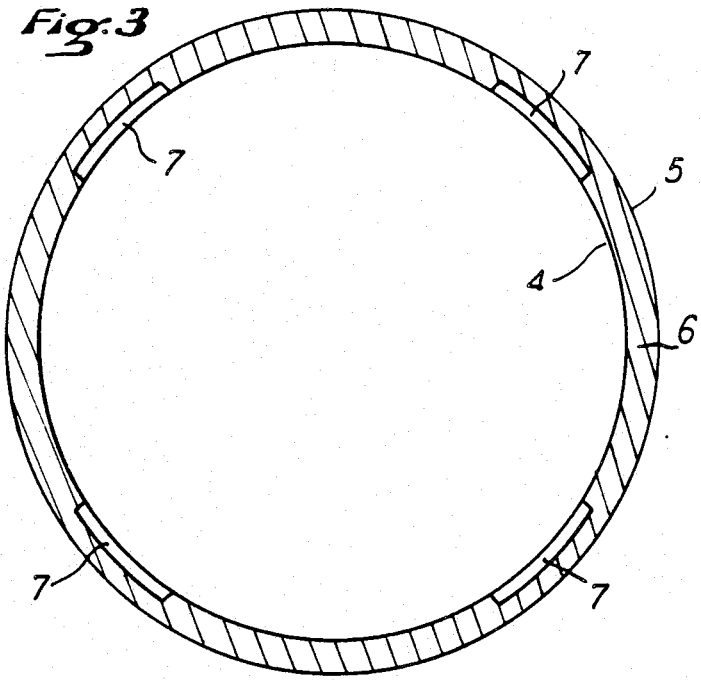
FIG. 3 is a scematic view in section taken at the level of the clearance gap between two concentric extrusion die members.
Figure 2:
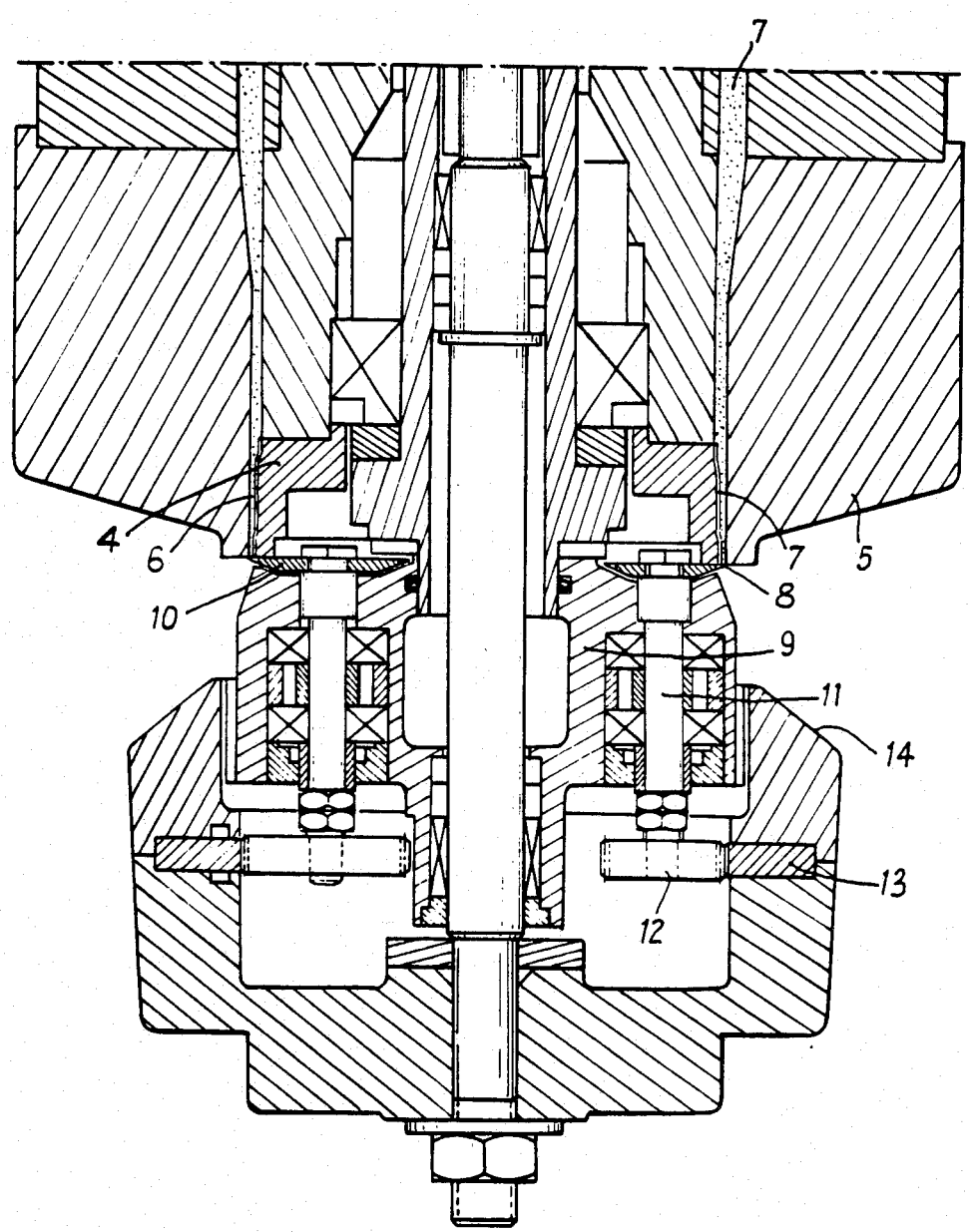
FIG. 2 is a view in axial section of apparatus for manufacturing the sheath of FIG. 1.

FIGS. 2 and 3 show an extrusion apparatus of the general type described in the French certificate of addition application no. 72-40691, at FIG. 2 of this certificate of addition.

The apparatus has two concentric dies, an inner die 4 and outer die 5 which define between them an annular clearance space or gap 6. The plastic material in a softened or moltened condition is introduced into the clearance gap through an annular channel 7', and leaves in the form of a tubular sheath or sleeve through an extrusion annulus 8. A rotatable housing or cage 9 driven by a motor (not shown) supports toothed perforating wheels 10, which are keyed or otherwise fixed to the upper ends of the respective shafts 11, which are mounted for rotation in bearings in the housing 9. Pinions 12 are fixed respectively to the lower ends of the shafts 11. The pinions 12 on the shafts of all the wheels are in constant mesh with an internally toothed ring gear 13 fixed to a stationary expander casing 14. This expander casing 14 is of a larger diameter than the extrusion annulus 8 and acts to stretch the tubular sheath radially to a larger diameter immediately after it is extruded.

Further details of the structure and operation of such apparatus are disclosed in the certificate of addition referred to above.

According to the invention, as can best be seen at FIG. 3, there are provided on the outer surface of the inner die 4, four longitudinal projections or enlargements 7 of increased radial thickness. These projections extend radially into the clearance space 6. These projections can be formed on the outside of the inner die from any appropriate metal such as chrome or nickel, particularily by such techniques as electrolytic or electrochemical plating. Alternatively, the projections 7 can be made when the inner die 4 is formed by machining away the regions between the projections, by such techniques as electro-erosion.

As an example, for a gap or clearance space 6 of 125 um. the radial thickness of projection 7 on the outer wall of the inner die 4 can be on the order of about 25 um.

Each projection or region of increased thickness 7 extends over a circumferential length of 45 mm and has a height of 35 mm.

In a variation not shown, each of the regions of increased thickness 7 can be formed on the inner surface of the outer die 5.

Correspondingly, according to the invention, a tubular sheath is extruded which has, as it leaves the extrusion slot, four longitudinal zones or bands of reduced thickness which are not perforated by the toothed wheels 6. To avoid such perforating, the teeth on portions of the periphery of the toothed wheels are eliminated, so that these regions form after stretching on the expander casing 14, a solid film structure 2 as shown at FIG. 1.

Although the invention has been described in connection with particular apparatus, it is in no way limited thereby and numerous changes and variations can be made without departing from the scope and spirit of the invention.

We claim:

1. Apparatus for making, from plastic material, a tubular sheath of the type having solid longitudinal bands of film connected together by longitudinal bands of net, said apparatus comprising, an extrusion nozzle with an annular gap between inner and outer concentric extrusion dies, and which opens into an extrusion annulus from which a tube of plastic material is extruded, means for extruding said tube of plastic material in the form of a tube having spaced apart longitudinally extending bands of predetermined width and of a first thickness, connected together by longitudinally extending bands of a predetermined width and of a second thickness less than the first thickness, toothed wheel means adjacent the extrusion annulus for perforating the bands of said first thickness, without perforating the bands of said second thickness, and expander means downstream of the toothed wheel means for stretching the extruded and perforated tube radially to stretch said perforated bands of said first thickness to form a net structure, and to stretch said bands of said second thickness to form a solid film structure and thereby form a tubular sheath having bands of net connected together by solid film bands of substatial width.

2. Apparatus according to claim 1 wherein, said means for extruding said tube of plastic material in the form of a tube having spaced apart longitudinally extending bands of predetermined width and of a first thickness, connected together by longitudinally extending bands of a predetermined width and of a second thickness less than the first thickness comprises, a plurality of circumferentially spaced apart longitudinally and radially extending projections in said clearance space on one of said dies.

3. Apparatus according to claim 2 wherein, said projections are on the inner die.

4. Apparatus according to claim 2 wherein, said projections are on the outer die.

5. Apparatus according to claim 2 wherein, said projections are are each of a radial thickness between about 10% and 60% of the width of the clearance space.

6. A tubular sheath formed by the apparatus of claim 1, have bands of net which are less than 2.5 times the width of the band of continuous film.

* * * * *